Nov. 14, 1939.  K. W. HALLDEN  2,180,203
FLYING CUTTING DEVICE
Original Filed Oct. 4, 1937  2 Sheets-Sheet 2
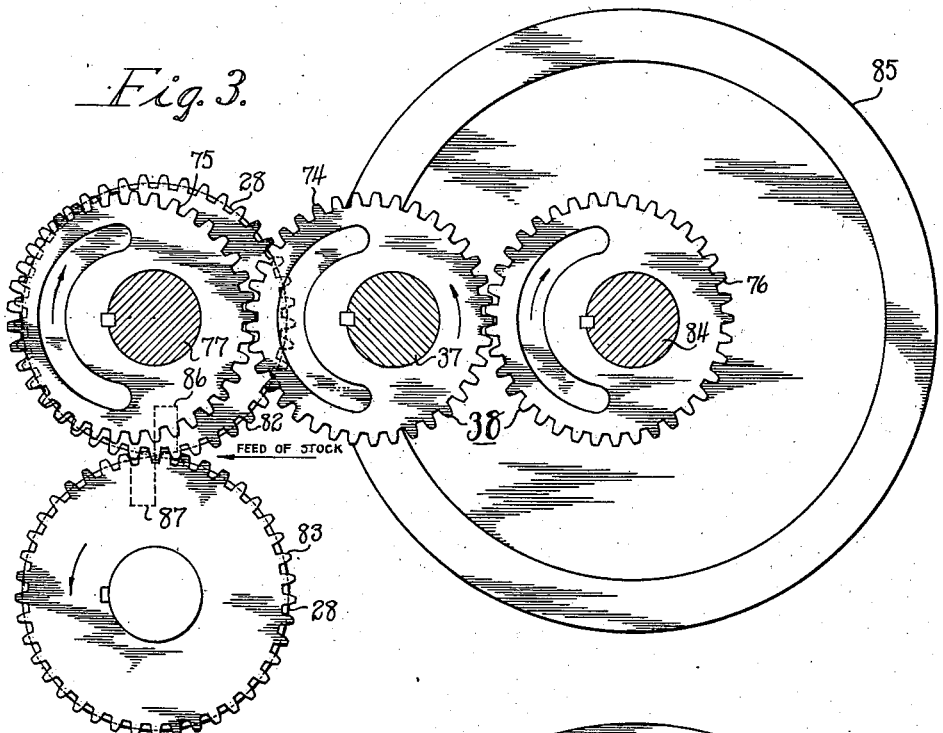
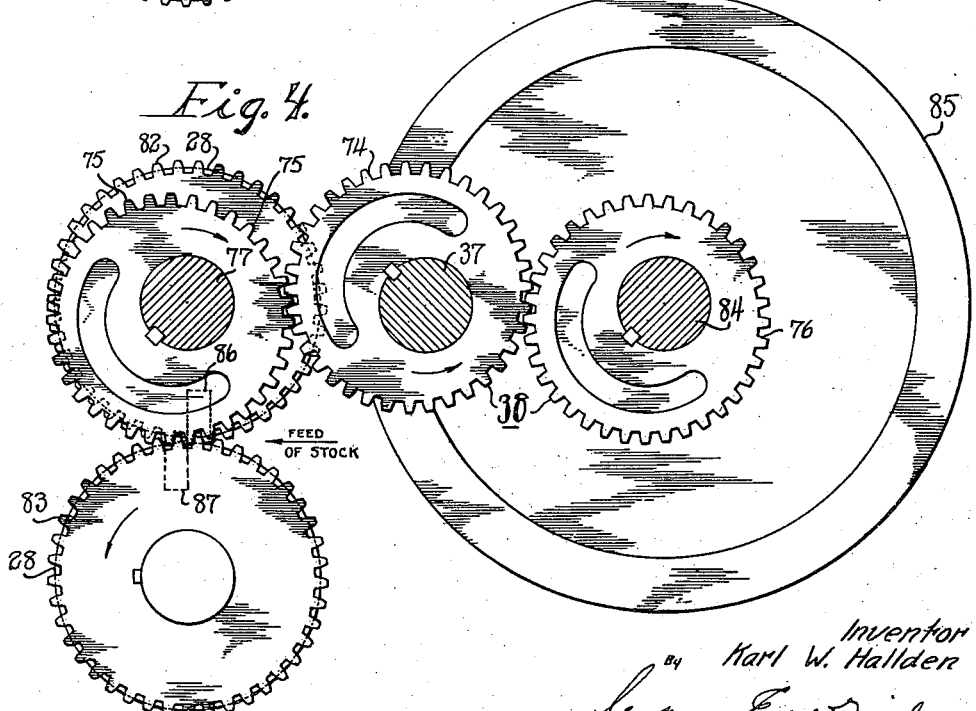
Inventor
Karl W. Hallden
By Seymour Earle Nichol
Attorney Patented Nov. 14, 1939

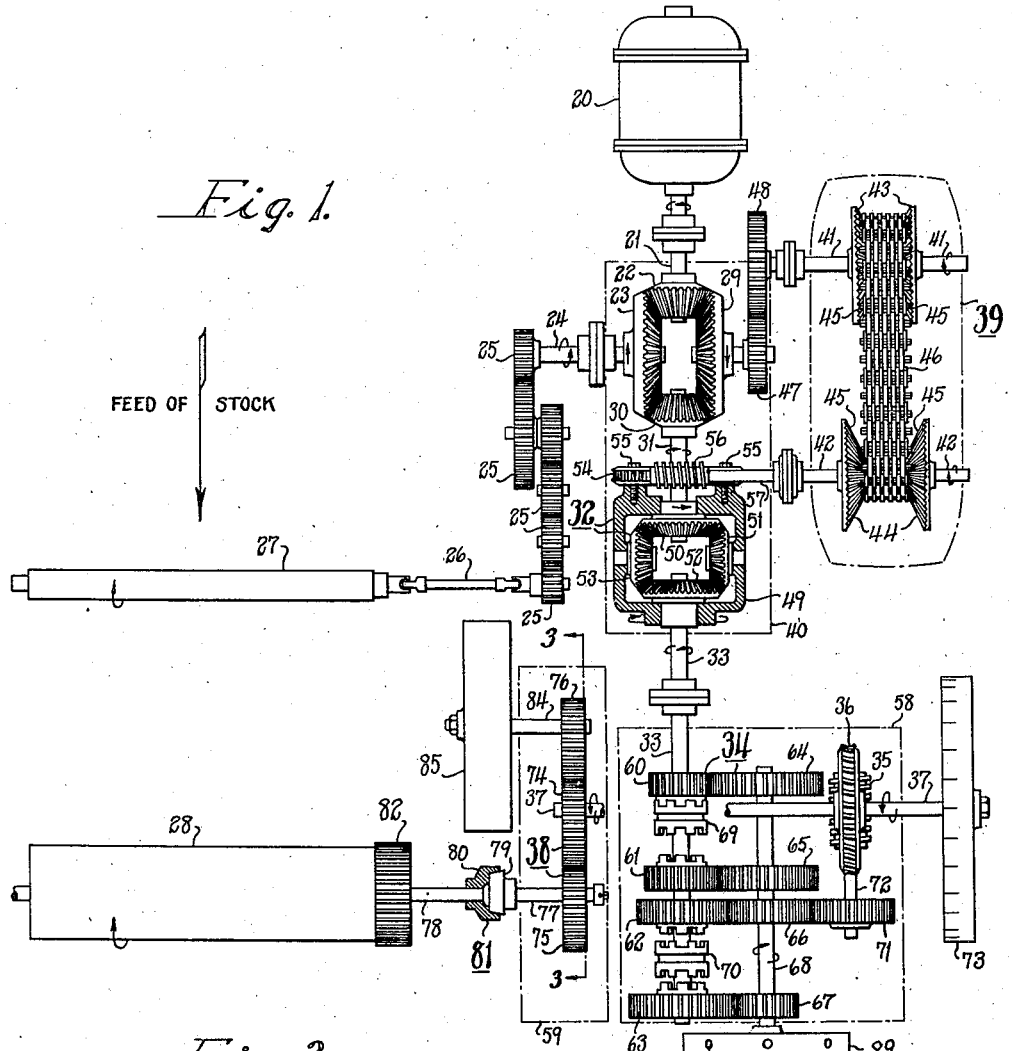

2,180,203

UNITED STATES PATENT OFFICE 2,180,203

FLYING CUTTING DEVICE

Karl W. Hallden, Thomaston, Conn.

Application October 4, 1937, Serial No. 167,193
Renewed October 10, 1939

5 Claims. (Cl. 164—68)

This invention relates to improvements in flying cutting devices, and more particularly to rotary flying cutting devices having means for synchronizing the speed of the cutters with the speed of feed of the stock, at the time of cut.

One object of this invention is to provide an improved rotary flying cutting device adapted to be adjusted, so that stock can be cut into any of various lengths while the stock is being fed, with means for synchronizing the speed of travel of the cutters with the speed of feed of the stock at the time of cut, together with counterbalance-means to counterbalance any surge that may be present in the cutter-carriers.

Another object of this invention is to provide an improved rotary flying cutting device adapted to be adjusted, so that stock can be cut into any of various lengths while the stock is being fed, provided with a pair of eccentric gears adapted to give a surge to the cutter-carriers and adapted to be angularly adjusted to synchronize the speed of travel of the cutters with the speed of feed of the stock at the time of cut, together with counterbalance-means for counterbalancing the surge of the cutter-carriers.

Another object of this invention is to provide an improved counterbalanced synchronized rotary flying cutting device formed of simple elements readily manufactured and readily assembled to produce a rugged durable mechanism.

With the above and other objects in view, as will appear to those skilled in the art from the present disclosure, this invention includes all features in said disclosure which are novel over the prior art.

In the accompanying drawings forming a part hereof, in which one way of carrying out the invention is shown for illustrative purposes:

Fig. 1 is a diagrammatic plan view illustrating one embodiment of the invention in the form of a counterbalanced synchronous rotary flying shear, with certain parts of the mechanism spread out horizontally from their true positions, for clearness;

Fig. 2 is a front elevation of Fig. 1 with the parts shown substantially in their true relationship;

Fig. 3 is a sectional view on line 3—3 of Fig. 1; and

Fig. 4 is a view similar to Fig. 3, but with the parts shown in different angular relationship.

In the description and claims, the various parts are identified by specific names for convenience, but they are intended to be as generic in their application as the prior art will permit.

In the employment of flying cutting devices, such as the rotary flying shear illustrated in the drawings, ordinarily, the stock to be cut is fed to the cutters or shear knives at a speed to give the highest feasible rate of output of sheared lengths of stock, and ordinarily this speed of feed is constant.

In order to cut the stock into any of various lengths while it is being fed without interruption, it is necessary to be able to vary the average angular velocity or average speed of rotation of the cutters. Thus, if the cutters are being rotated at a given average speed and with a given rate of feed of stock to accomplish a certain length of cut, then, if it is desired to cut stock into shorter lengths, it is necessary to increase the average speed of rotation of the cutters in order that they shall come into cutting relation a greater number of times in a given unit of time, thereby cutting the stock into shorter lengths. Similarly, if it is desired to cut longer lengths, the average speed of rotation of the cutters is decreased to produce a fewer number of cuts in a given unit of time, thereby accomplishing cuts of longer lengths, the speed of feed of the stock at all times being the same. To avoid damage to the stock being cut, means is provided to synchronize the speed of rotation of the cutters with the speed of feed of the stock at the time of cut.

Referring to Fig. 1 of the drawings, the electric motor 20, through shaft 21, bevel-gears 22, 23, shaft 24, gearing 25 and coupling-bars 26, drives the feed-rolls 27 (only one of which is here shown) to feed the stock to the cutter-rolls 28.

The motor 20 drives the cutter-rolls 28 through the bevel-gears 22, 23, 29 and 30, shaft 31, differential-mechanism 32, shaft 33, gear-change mechanism or change-speed gearing 34, worm 35, worm-wheel 36, shaft 37, and synchronizing-mechanism 38.

The change-speed gearing 34 serves to give a limited number of relatively large steps or changes in the average speed of rotation of the cutter-rolls 28, and in order to secure fine adjustment in the average speed of the cutter-rolls over the ranges intervening between the different speed-changing gears, a special infinitely-variable-speed unit 39 is employed. This unit 39 provides positive infinitely-variable speed changes, and the particular unit illustrated is known as the "P. I. V.," manufactured by the Link-Belt Company, of Philadelphia, Pennsylvania.

The nest of bevel-gears 22, 23, 29 and 30, and the differential-mechanism 32, for convenience are mounted in a casing indicated at 40. The speed-change unit 39 broadly consists of two shafts 41 and 42, respectively provided with pairs of wheels 43 and 44, each having a cone face provided with teeth 45 adapted to be engaged by a special chain 46. The cone wheels of each pair are adjustable toward and from one another by suitable well-known mechanism (not shown) in order to accomplish an infinite range of variations in the speed between the shafts 41 and 42, in a well-known manner. The shaft 41 is driven from bevel-gear 29 by means of the gears 47 and 48.

The differential-mechanism 32 includes a differential-housing 49 having a nest of bevel-gears 50, 51, 52 and 53, pivotally mounted therein. A worm-wheel 54 is secured to one end of the differential-housing 49 by any suitable fastening means, such, for example, as by the bolts 55. A worm 56 is meshed with the worm-wheel 54 and is secured or formed on a shaft 57 coupled to the shaft 42 of the variable-speed unit 39.

The speed-change gearing 34 is shown in Fig. 1 as enclosed in a broken-line enclosure 58 which is horizontally displaced from the enclosure 59 containing the synchronizing-mechanism 38. This horizontal displacement of these two mechanisms is merely one of convenience for clearness of illustration in the diagrammatic showing of Fig. 1. Actually, the synchronizing-mechanism 38 can be located above the speed-change gearing 34 and contained in a single casing similar to the manner more fully disclosed in my companion application Serial No. 167,192 on Flying cutting devices, filed on even date herewith.

Also, in Fig. 1, parts 35, 36, 71 and 72 are shown to the right of their actual position, for clearness, these parts actually being located directly above the shaft 68, as will be seen from Fig. 2. The shaft 33 of the change-speed gearing 34 has four gears 60, 61, 62 and 63, mounted for free rotation on the shaft 33 and respectively meshing with gears 64, 65, 66 and 67 keyed on shaft 68. A clutch-member 69 is splined on shaft 33 and has clutch-teeth at its opposite ends adapted to be selectively engaged with clutch-teeth of one or the other of gears 60, 61. Another clutch-member 70 is splined on shaft 33 between gears 62 and 63, and has clutch-teeth at its opposite ends adapted to be selectively engaged with corresponding clutch-teeth on one or the other of gears 62, 63. The clutch-members 69 and 70 are operated by any suitable or well-known means. Thus, by bringing into action one or the other of pairs of gears 60 and 64, 61 and 65, 62 and 66, 63 and 67, any one of four different speeds can be given to the shaft 68. Gear 66 on shaft 68 is also in mesh with a gear 71 above it, which gear 71 is keyed to a shaft 72 having the worm 35 secured or formed on shaft 72. The worm 35 meshes with worm-wheel 36 which is keyed on shaft 37. Shaft 37 has a flywheel 73 keyed thereto.

Keyed to shaft 37 is an eccentric gear 74 which meshes with each of two eccentric gears 75 and 76. Eccentric gear 75 is keyed to shaft 77, which is axially aligned with another shaft 78, which shaft 78 is secured to the upper one of the pair of cutter-carriers or rolls 28. The shafts 77 and 78 respectively have friction-clutch or coupling parts 79 and 80 secured to the respective shafts and which together form a friction-coupling 81 which permits of adjustment of the eccentric gears to any desired angular relationship relative to the upper cutter-roll 28. The two cutter-rolls may be driven together by any suitable means, such, for example, as the gears 82 and 83. The eccentric gear 76 is keyed to a shaft 84 to which is also keyed a counterbalance-flywheel 85. The eccentric gears 74 and 75 serve to drive the cutter-rolls 28 with a surging or non-uniform rotation, and the eccentric gear 76 and counterbalance-flywheel 85 serve to counterbalance the surging motion of the cutter-rolls. The eccentric gears 74, 75 and 76 are all identical. All constructions for the present application can be substantially the same as corresponding constructions more fully disclosed in my companion application Serial No. 167,192 on Flying cutting devices, filed on even date herewith.

Ordinarily, the stock, which may for example be sheet-metal, is given a speed of feed to give the highest feasible rate of output of sheared lengths of stock, and ordinarily this speed of feed is constant. In other words, the motor 20 is ordinarily driven at a constant speed of rotation, and through the pairs of upper and lower feed-rolls 27 which are driven in the usual and well-known way, gives a constant speed of feed to the stock.

The stock is fed between the upper and lower cutter-rolls to be cut by cutters or knives 86 and 87. If the cutter-rolls, at the instant the cutters make the cut, should be going faster or slower than the speed of feed of the stock, there would be a tendency for the stock to be damaged. Therefore, it is important to have the speed of travel of the cutters at the instant of cut, the same as the speed of feed of the stock.

Inasmuch as the stock is fed at constant speed, the only way in which stock can be cut into various of selected desired lengths, is to change the average angular velocity, or average rate of rotation, or the number of rotations or revolutions of the cutter-rolls in a given unit of time. Thus, if the cutter-rolls have a given average speed at a particular time, the stock will be cut into pieces of a given uniform length. If, now, the average speed of the rolls is doubled, so that twice the number of rotations of the rolls occur in a given interval of time, then the lengths of stock being cut will be half of what they formerly were.

Let it be assumed that it is desired to cut the stock into pieces of a relatively-long length. Such one or another of the pairs of gears of the gear-change mechanism 34 will be brought into action as will be proper, and the infinitely variable speed-change unit 39 will be given such adjustment as to get the exact speed of rotation of the rolls 28 that is necessary for making the selected length of cut desired.

The action of the speed-changing unit 39 is such that the worm 56 is rotated at such a speed and in such a direction as to let off or permit the differential-housing 49 to rotate, thereby changing the speed relationship between the shafts 31 and 33, which shafts would have the same speed in opposite directions if the housing 49 were held against rotation. But, when the worm 56 is rotated to permit a backing-off action, the speed of the shaft 33 will be decreased, thus permitting of securing an infinitely-fine variation in the speed of rotation of the shaft 33, and consequently of the rolls 28.

By placing the end of a lever or bar (not shown) in one or another of holes 88 of the flywheel 89 secured on shaft 68, the mechanism can be rotated by hand to bring the cutters 86 and 87 into cutting position.

As the gear-change mechanism 34 and the speed-change unit 39 has been set to give the relatively-long length of cut, this means that the average angular velocity or average speed of rotation of the cutters and cutter-rolls is relatively slow compared to the speed of feed of the stock, which latter is at all times constant. Therefore, it will be necessary to give a surge or increased angular velocity to the cutters and cutter-rolls at the instant of cut, in order that the speed of the cutters may equal the speed of feed of the stock at the instant of cut. To bring this about, the friction coupling-members 79 and 80 are uncoupled, whereupon the flywheel 89 is rotated by hand in a manner previously described to change the angular relationship between the coupling-members 79 and 80 and also between the eccentric gears 74, 75 and the cutter-rolls 28, after which the coupling-members 79 and 80 are again coupled together, to cause the shafts 77 and 78 to rotate as a unit.

Let it now be assumed that the gears 74 and 75 occupy the positions shown in Fig. 3 when the cutters 86 and 87 have just completed a cutting operation just prior to coming to maximum surge position, to thus temporarily increase the speed of rotation of the cutters to an amount which will be assumed to be proper to equal the speed of feed of the stock at the instant of cut, to thus avoid damaging the stock.

If it should now be desired to cut a re'atively-shorter length, the gear-change mechanism 34 and the speed-change unit 39 will be set to cut the stock into pieces of such shorter length as desired. Inasmuch as the stock is fed at a constant sped at all times, this means that the average speed of rotation of the cutters has been increased to bring about a shorter length of cut. Therefore, with the setting of the eccentric gears 74, 75 in the positions shown in Fig. 3, the cutters will have too high speed at the instant of cut, and, therefore, it will now be necessary to uncouple the friction coupling-members 79 and 80 and rotate the flywheel 89 by hand as previously described, to bring the eccentric gears 74 and 75 into a different angular position relative to the cutters 86 and 87 when in cutting position. Such a different angular position is indicated in Fig. 4, wherein it will be seen that the eccentric gears 74 and 75 have such a relationship between them at the instant of cut of the cutters 86 and 87 that the cutters have a less surge or angular speed at the instant of cut, to thus again synchronize the angular speed of the cutters with the speed of feed of the stock at the instant of cut. Similarly, when any other length of cut is desired, the eccentric gears 74 and 75 will have their relative angular positions adjusted with relation to the cutters at the instant of cut, in order to bring about such speed of rotation at the instant of cut as to synchronize the speed of the cutters with the speed of feed of the stock.

Preferably, the various synchronizing adjustments are accomplished by utilizing the accelerating arc-portion of the driving-gear 74 to drive the gear 75 at the time of cut, so that the gears 74 and 75 and upper roll 28 and its gear 82 are accelerating at the time of cut, and preferably also during a further interval, to avoid backlash between the gears 82 and 83 to keep the edges of the cutters 86 and 87 close together to produce the best and cleanest cut, and also to have the cutters get out of the way of the stock being fed.

It will be noted that regardless of what angular position the eccentric gears 74 and 75 are adjusted to with relation to the cutter-rolls 28 for the purpose of securing synchronization, that exactly the same rotational surge occurs during each complete rotation of the cutter-rolls 28, the position of maximum surge simply being displaced angularly by adjustment of the eccentric gears 74 and 75 in the accomplishing of the synchronization. And it will be observed that due to the relationship between the eccentric gears 74, 75 and 76, that the eccentric gear 76, shaft 84 and flywheel 85 at all times have an opposite surge relationship to that of the eccentric gear 75 and the cutter-rolls 28, so that when the speed of the cutter-rolls is increasing to maximum surge during the cutting operations, the speed of the counterbalancing-flywheel 85 is decreasing to minimum surge, and vice versa. Thus, it will be seen that the flywheel 85 at all times counteracts the variable stresses which would otherwise be introduced into the drive by the surging rotation of the cutter-rolls.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. A flying cutting device, comprising: cutter-carrier means provided with cutter-means; feed-means adapted to feed stock to said cutter-means; driving-means for driving said cutter-carrier means to cause said cutter-means to cut said stock while it is being fed; said driving-means including a pair of eccentric gears and speed-changing means in series; adjustable coupling-means for changing the angular relationship between said cutter-carrier means and said eccentric gears to synchronize the speed of travel of said cutter-means with the speed of feed of the stock, at the time of cut, said eccentric gears being adapted to cause said cutter-carrier means to be rotated with a non-uniform motion; counterbalance-means; and eccentric-gear means in driving relation with said counterbalance-means and adapted to rotate the latter with a non-uniform motion of opposite character to that of the cutter-carrier means.

2. A flying cutting device, comprising: cutter-carrier means provided with cutter-means; feed-means adapted to feed stock to said cutter-means; driving-means for driving said cutter-carrier means to cause said cutter-means to cut said stock while it is being fed; said driving-means including a pair of eccentric gears and speed-changing means in series; adjustable coupling-means for changing the angular relationship between said cutter-carrier means and said eccentric gears to synchronize the speed of travel of said cutter-means with the speed of feed of the stock, at the time of cut, said eccentric gears being adapted to cause said cutter-carrier means to be rotated with a non-uniform motion; a counterbalance-shaft and counterbalance-means secured thereto; and a third eccentric gear secured to said counterbalance-shaft and in driving relation with the driving-gear of said pair of eccentric gears and adapted to rotate said counterbalance-means with a non-uniform motion of opposite character to that of the cutter-carrier means.

3. A flying cutting device, comprising: a pair of rotatably-mounted cutter-carriers; a pair of cooperating cutters, one mounted on each cutter-carrier; feed-means adapted to feed stock to said cutters; driving-means for rotating said cutter-carriers to cause said cutters to cut said stock while it is being fed; said driving-means including a pair of eccentric gears and speed-changing means in series; adjustable coupling-means for changing the angular relationship between said cutter-carriers and said eccentric gears to synchronize the speed of travel of said cutters with the speed of feed of the stock, at the time of cut, said eccentric gears being adapted to cause said cutter-carriers to be rotated with a non-uniform motion; counterbalance-means; and eccentric-gear means in driving relation with said counterbalance-means and adapted to rotate the latter with a non-uniform motion of opposite character to that of the cutter-carriers.

4. A flying cutting device, comprising: a pair of rotatably-mounted cutter-carriers; a pair of cooperating cutters, one mounted on each cutter-carrier; feed-means adapted to feed stock to said cutters; driving-means for rotating said cutter-carriers to cause said cutters to cut said stock while it is being fed; said driving-means including a pair of eccentric gears and speed-changing means in series; adjustable coupling-means for changing the angular relationship between said cutter-carriers and said eccentric gears to synchronize the speed of travel of said cutters with the speed of feed of the stock, at the time of cut, said eccentric gears being adapted to cause said cutter-carriers to be rotated with a non-uniform motion; a counterbalance-shaft and counterbalance-means secured thereto; and a third eccentric gear secured to said counterbalance-shaft and in driving relation with the driving-gear of said pair of eccentric gears and adapted to rotate said conuterbalance-means with a non-uniform motion of opposite character to that of the cutter-carriers.

5. A flying cutting device, comprising: cutter-carrier means provided with cutter-means; feed-means adapted to feed stock to said cutter-means; driving-means for driving said cutter-carrier means to cause said cutter-means to cut said stock while it is being fed; said driving-means including driving and driven eccentric gears and speed-changing means in series; adjustable coupling-means for changing the angular relationship between said cutter-carrier means and said driving eccentric gear to synchronize the speed of travel of said cutter-means with the speed of feed of the stock, at the time of cut and while the accelerating arc-portion of the driving eccentric gear is driving the driven eccentric gear, said eccentric gears being adapted to cause said cutter-carrier means to be rotated with a non-uniform motion; counterbalance-means; and eccentric-gear means in driving relation with said counterbalance-means and adapted to rotate the latter with a non-uniform motion of opposite character to that of the cutter-carrier means.

KARL W. HALLDEN.